United States Patent
Troy

(10) Patent No.: US 9,929,548 B2
(45) Date of Patent: Mar. 27, 2018

(54) CABLE STRIPPER HAVING AN ADJUSTABLE BUSHING

(71) Applicant: Greenlee Textron Inc., Rockford, IL (US)

(72) Inventor: Andrew Francis Troy, West Dundee, IL (US)

(73) Assignee: TEXTRON INNOVATIONS INC., Providence, RI (US)

( * ) Notice: Subject to any disclaimer, the term of this patent is extended or adjusted under 35 U.S.C. 154(b) by 165 days.

(21) Appl. No.: 14/818,616

(22) Filed: Aug. 5, 2015

(65) Prior Publication Data

US 2017/0040783 A1    Feb. 9, 2017

(51) Int. Cl.
*H02G 1/12* (2006.01)

(52) U.S. Cl.
CPC .................. *H02G 1/1226* (2013.01)

(58) Field of Classification Search
CPC ...... H02G 1/12; H02G 1/1202; H02G 1/1204; H02G 1/1221; H02G 1/1224; H02G 1/1226
See application file for complete search history.

(56) References Cited

U.S. PATENT DOCUMENTS

| | | | |
|---|---|---|---|
| 2,419,511 A | 4/1947 | Vaughan, Jr. | |
| 3,710,654 A | 1/1973 | Halverson et al. | |
| 3,769,705 A | 11/1973 | Biddle | |
| 3,869,791 A * | 3/1975 | Horrocks | H02G 1/1226 30/90.1 |
| 4,449,298 A * | 5/1984 | Putz | H02G 1/1226 30/90.1 |
| 5,669,276 A | 9/1997 | Spacek | |
| 6,334,253 B1 | 1/2002 | Cheng | |
| 6,467,171 B2 | 10/2002 | Tarpill | |
| 7,243,429 B2 | 7/2007 | Landes et al. | |
| 2004/0045165 A1* | 3/2004 | Russell | H02G 1/1221 30/91.2 |

OTHER PUBLICATIONS

GTS-1930 Saber Cable Stripper Brochure, Oct. 2014, 4 pages.
GTS-1930 Cable Stripper Instruction Manual, 12 pages, Oct. 2014.

* cited by examiner

*Primary Examiner* — Stephen Choi
(74) *Attorney, Agent, or Firm* — Klintworth & Rozenblat IP LLP

(57) ABSTRACT

A cable stripper is provided which has an adjustable bushing which can be adjusted to accept a variety of differently size cables. The cable stripper is rotated around the cable to strip the insulation from a cable. The cable stripper can be attached to an existing tool to impact rotation of the cable stripper around the cable. The cable stripper includes a bushing having an axial passageway and a plurality of spaced slots which are in communication with the passageway, a plurality of cable retention blocks attached to the bushing, and a blade member mounted on the bushing, the blade member being seated within the passageway. The cable retention blocks are moveable relative to the bushing to pass through the slots and into the passageway to engage the cable mounted within the passageway.

16 Claims, 9 Drawing Sheets

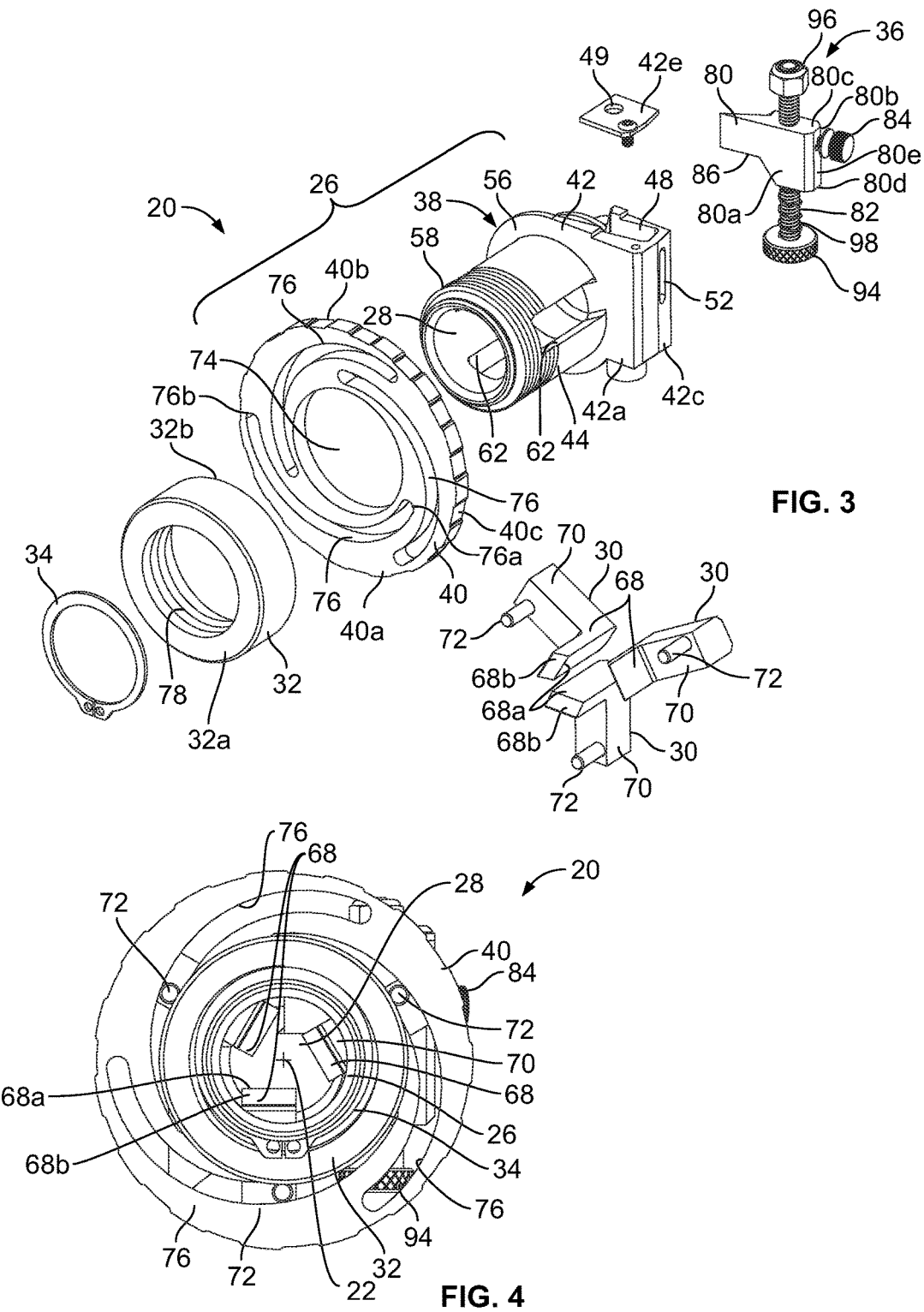

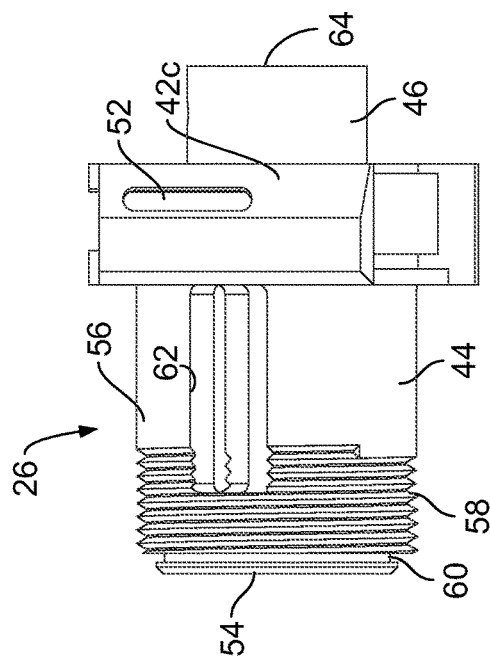
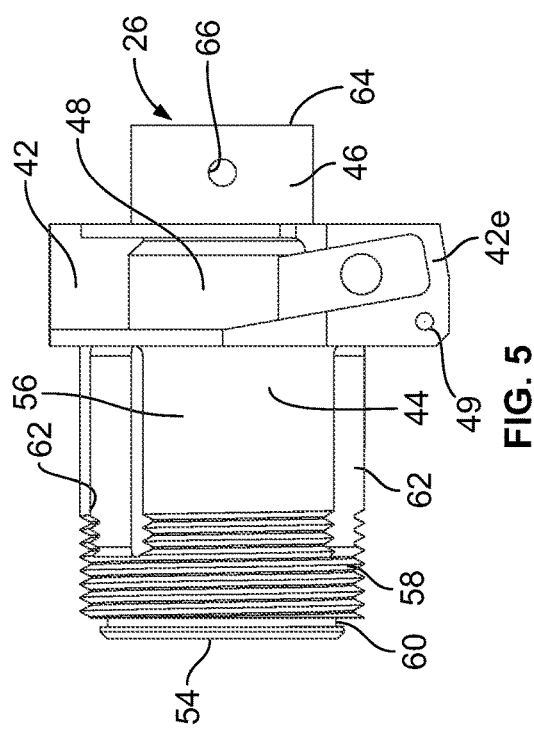
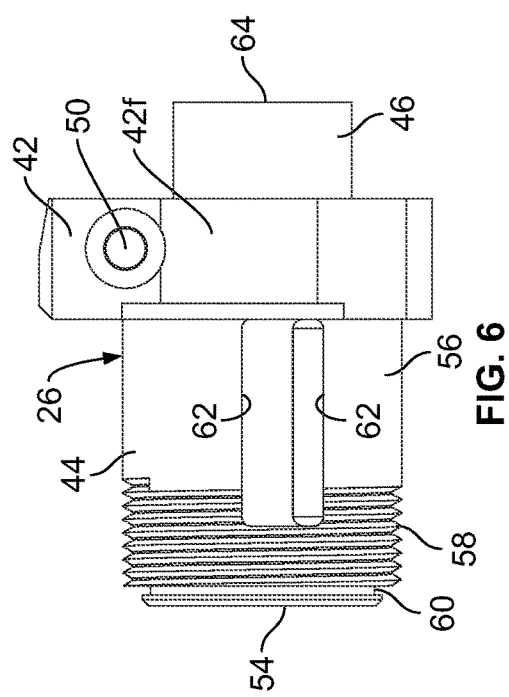

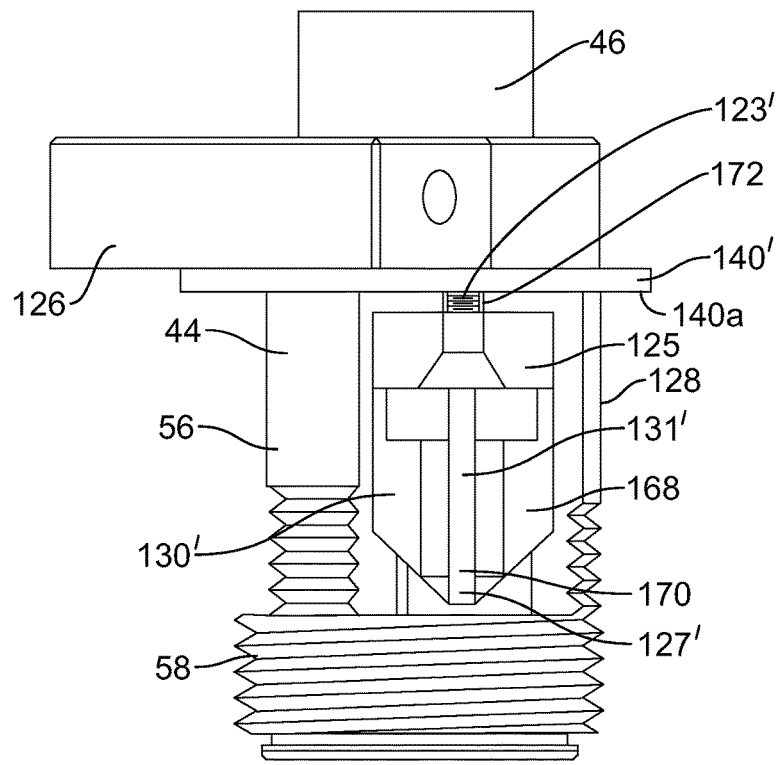
FIG. 18
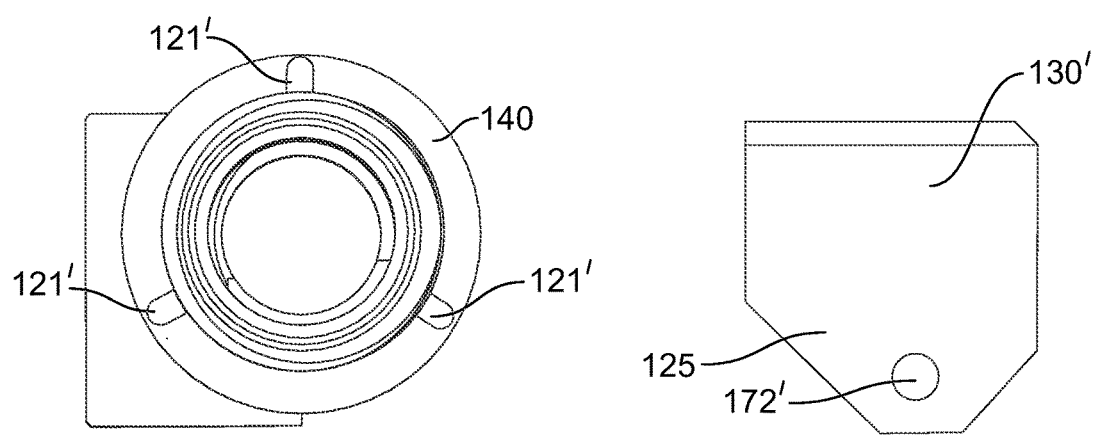
FIG. 19  FIG. 20

US 9,929,548 B2

CABLE STRIPPER HAVING AN ADJUSTABLE BUSHING

FIELD OF THE DISCLOSURE

The present disclosure relates to cable stripping, and relates specifically to a bushing that is adjustable so the bushing can accept cables of varying outer diameters and insulation thicknesses, while still having the ability to connect to existing tools used in the field of cable stripping.

BACKGROUND

In the field of cable stripping, bushings with attached blades are used to attach to tools that facilitate the rotation of the bushing around the cable. Ratcheting handles and adapters for drills are two examples of tools to which these bushings can connect. Each bushing must be individually chosen to match the size of the cable diameter the user wishes to strip.

End users had to own the exact sized bushing that matches the size of the cable the user wanted to strip the insulation/jacket. As a result, users would need a kit of many different bushings to strip the insulation/jacket from a variety of cable sizes and types.

SUMMARY

A cable stripper is provided which has an adjustable bushing which can be adjusted to accept a variety of differently size cables. The cable stripper is rotated around the cable to strip the insulation from a cable. The cable stripper can be attached to an existing tool to impact rotation of the cable stripper around the cable. The cable stripper includes a bushing having an axial passageway and a plurality of spaced slots which are in communication with the passageway, a plurality of cable retention blocks attached to the bushing, and a blade member mounted on the bushing, the blade member being seated within the passageway. The cable retention blocks are moveable relative to the bushing to pass through the slots and into the passageway to engage the cable mounted within the passageway.

This Summary is provided merely for purposes of summarizing some example embodiments so as to provide a basic understanding of some aspects of the disclosure. Accordingly, it will be appreciated that the above described example embodiments are merely examples and should not be construed to narrow the scope or spirit of the disclosure in any way. Other embodiments, aspects, and advantages of various disclosed embodiments will become apparent from the following detailed description taken in conjunction with the accompanying drawings which illustrate, by way of example, the principles of the described embodiments.

BRIEF DESCRIPTION OF THE DRAWINGS

The organization and manner of the structure and operation of the disclosed embodiments, together with further objects and advantages thereof, may best be understood by reference to the following description, taken in connection with the accompanying drawings, which are not necessarily drawn to scale, wherein like reference numerals identify like elements in which:

FIG. 3 is an exploded front perspective view of the cable stripper of FIG. 1;
FIG. 4 is a front elevation view of the cable stripper of FIG. 1;
FIG. 5 is a top plan view of a bushing of the cable stripper of FIG. 1;
FIG. 6 is a bottom plan view of the bushing of FIG. 5;
FIG. 7 is a side elevation view of the bushing of FIG. 5;
FIG. 18 is a top plan view of an alternate cable retention block and bushing which may be used in the cable stripper of FIG. 10;
FIG. 19 is front elevation view of the bushing of FIG. 18;
and
FIG. 20 is a rear elevation view of the cable retention block of FIG. 18.

DETAILED DESCRIPTION

Figure 1:
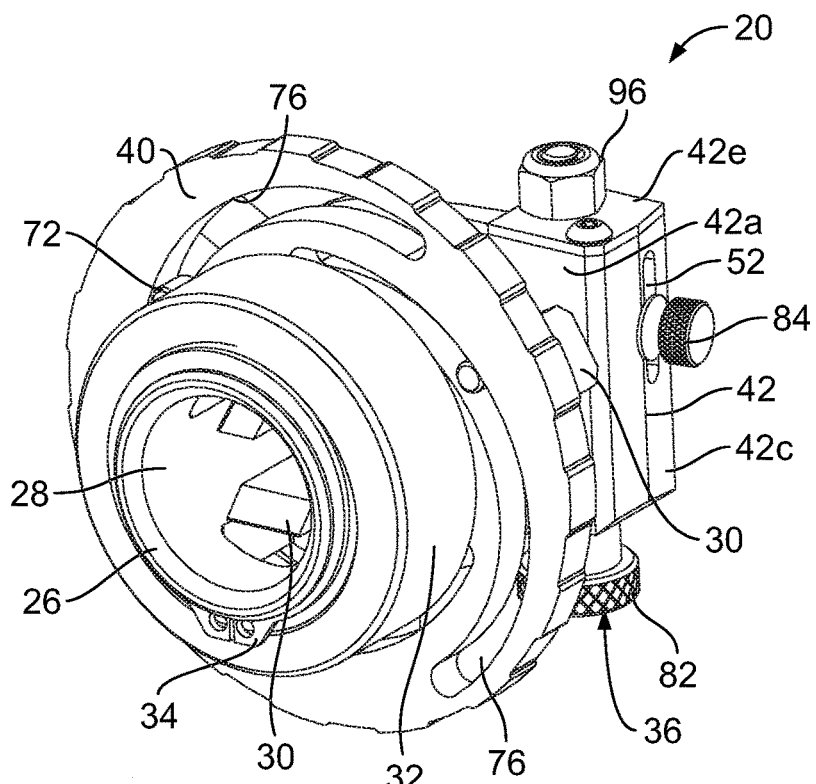
FIG. 1 is a front perspective view of a cable stripper.
Figure 2:
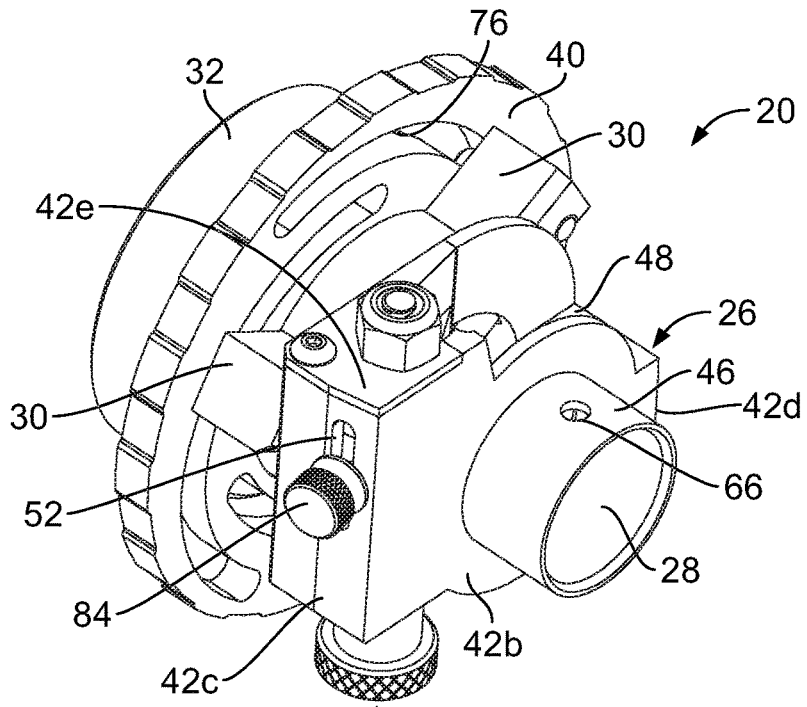
FIG. 2 is a rear perspective view of the cable stripper of FIG. 1.
Figure 8:
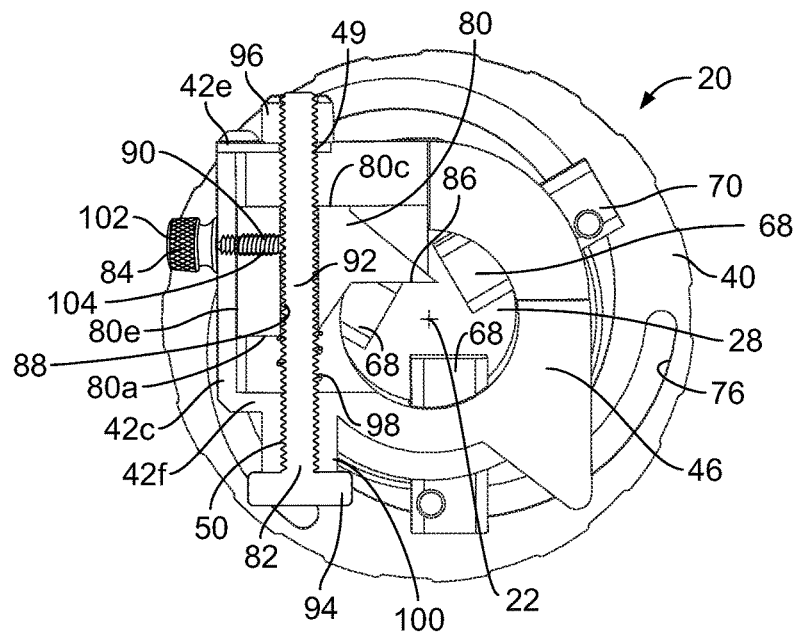
FIG. 8 is a cross-sectional view of the cable stripper of FIG. 1.

A cable stripper 20, 120, 120' is provided which is used to strip the insulation/jacket from a cable (not shown). The cable stripper 20, 120, 120' centers the cable and aligns the axis of the cable with a rotational axis 22 of the cable stripper 20, 120, 120'. The rotational axis 22 of the cable stripper 20, 120, 120' is capable of aligning with an existing tool 24, such as ratcheting handles and adapters for drills, that is attached to the cable stripper 20, 120, 120'. Examples of such existing tools 24 are the Greenlee GTS-1930 and the Greenlee GTSD-1930. The existing tool 24 enables a user to provide a rotational motion to the cable stripper 20, 120, 120' relative to the cable. This allows the existing tools 24 to impart a rotational motion to the cable stripper 20, 120, 120' because the existing tools 24 are rotating in the same axis as the stationary cable. The terms upper, lower, front, back and the like are used for ease in describing the cable stripper 20, 120, 120' and do not denote a required orientation for use.

FIGS. 1-8 show the cable stripper 20 which includes a bushing 26 having a central passageway 28, cable retention blocks 30 mounted on the bushing 26 and capable of moving relative to the bushing 26, a locking ring 32 and a retaining ring 34 mounted on the bushing 26, and a blade position adjustment mechanism 36 mounted on the bushing 26. The rotational axis 22 is defined through the center of the passageway 28. The bushing 26 is formed of a housing 38 and a mounting plate 40 rotatably mounted on the housing 38.

The housing 38 includes a blade mount 42 having a forward shaft 44 extending from a front end, and a rearward shaft 46 extending from a second, rear end of the blade mount 42. The passageway 28 extends through the forward shaft 44, the blade mount 42 and the rearward shaft 46. The rearward shaft 46 is attached to the existing tool 24.

As shown by way of example, the blade mount 42 is formed from front and rear walls 42a, 42b which are joined together by side walls 42c, 42d, a top wall 42e and a bottom wall 42f. A portion of the top end of the blade mount 42 is open such that a slot 48 is formed between the front, rear and side and top walls 42a, 42b, 42c, 42d, 42e. The slot 48 is in communication with the passageway 28. As shown by way of example, the top wall 42e is formed as a separate plate attached to the front, rear and side and top walls 42a, 42b, 42c, 42d so that the blade position adjustment mechanism 36 can be assembled with the mount 42. An aperture 49 is formed through the top wall 42e and is in communication with the passageway 28. An opening 50 is formed through the bottom wall 42f and is in communication with the passageway 28. The side wall 42c has an elongated slot 52 formed therethrough and is in communication with the passageway 28.

The forward shaft 44 is cylindrical and has a rearward end which is connected to the front wall 42a and which extends forwardly from the front wall 42a. The forward shaft 44 ends in a front, free end 54. The forward shaft 44 has an unthreaded portion 56 extending outwardly from the front wall 42a, a threaded portion 58 extending outwardly from the unthreaded portion 56, and a groove 60 provided at the end of the threaded portion 58. A plurality of spaced apart slots 62 extend through the forward shaft 44. The slots 62 start at the end of the rearward end of the forward shaft 44, extend through the unthreaded portion 56 and may extend along a section of the threaded portion 58. The slots 62 are parallel to the rotational axis 22. As shown by way of example, three slots 62 are provided and are equidistantly spaced around the forward shaft 44.

The rearward shaft 46 is cylindrical and has a forward end which is connected to the rear wall 42b and which extends rearwardly from the rear wall 42b. The rearward shaft 46 ends in a rear, free end 64. The rearward shaft 46 is unthreaded, but may have aperture 66 therethrough which communicates with the passageway 28.

Respective cable retention blocks 30 seat within respective ones of the slots 62 through the bushing 26 and extend into the passageway 28. Each cable retention block 30 may be identically formed. As shown by way of example, each cable retention block 30 is formed as a generally L-shaped member with a gripping portion 68 and an attachment portion 70 which is perpendicular to the gripping portion 68. The gripping portion 68 includes an inner face 68a for gripping the cable. The inner face 68a of the gripping portion 68 may be planar or may take other shapes which are suitable for gripping the cable. A front face 68b of each gripping portion 68 may be beveled. The attachment portion 70 extends perpendicularly from the gripping portion 68 and has a pin 72 extending therefrom. The pins 72 may be integrally formed with the cable retention blocks 30, or may be formed as separate members and attached to the attachment portions 70. It will be appreciated that the illustrated L-shaped form factor of the cable retention blocks 30 is provided by way of example, and the shape of the cable retention blocks 30 may take any of a variety of alternative forms. For example, one or more cable retention blocks 30 may be formed of a cube with a pin extending outwardly therefrom.

To assemble the cable retention blocks 30 with the bushing 26, each gripping portion 68 is inserted through a respective slot 62 until the attachment portion 70 seats within the slot 62 and the gripping portion 68 is within the passageway 28. The attachment portion 70 may engage the wall that forms the respective slot 62.

The mounting plate 40 is mounted on the unthreaded portion 56 of the forward shaft 44 and the pins 72 on the cable retention blocks 30 engage with the mounting plate 40. The mounting plate 40 can be rotated around the forward shaft 44 and fixed into place relative to the forward shaft 44 as described herein.

The mounting plate 40 has opposite front and rear surfaces 40a, 40b and an outer edge 40c extending therebetween. As shown by way of example, the mounting plate 40 is circular, but the outer edge 40c may take other shapes, for example hexagonal. The mounting plate 40 may have structure for enabling a user to easily grip the mounting plate 40, such as knurling, steps or the like on the outer edge 40c. The mounting plate 40 has a central circular passageway 74 extending between the front and rear surfaces 40a, 40b through which the forward shaft 44 extends. A center of the passageway 74 aligns with the rotational axis 22. The mounting plate 40 further includes a plurality of curved grooves 76 which extend between the front and rear surfaces 40a, 40b. Each groove 76 commences at an inner end 76a which is radially equidistant from the center of the passageway 74 and ends at an outer end 76b which is radially equidistant from the center of the passageway 74. Each groove 76 is formed of a partial spiral. Adjacent grooves 76 partially overlap each other in a radial direction. As shown by way of example, three curved grooves 76 are provided. The inner end 76a of each groove 76 is inwardly of the outer end 76b of the adjacent groove 76. To assemble the mounting plate 40 with the forward shaft 44 and with the cable retention blocks 30, the mounting plate 40 is slid along the forward shaft 44 until the pins 72 enter into the respective grooves 76 and the rear surface 40b of the mounting plate 40 engages the forward faces of the attachment portions 70 of the cable retention blocks 30. The gripping portions 70 extend through the passageway 74.

The locking ring 32 seats on the threaded portion 58 of the forward shaft 44 such that the mounting plate 40 and cable retention blocks 30 are between the locking ring 32 and the front wall 42a of the mount 42. The locking ring 32 has a forward end 32a, a rearward end 32b and an internally threaded passageway 78 which extends from the forward end 32a to the rearward end 32b. The threaded passageway 78 mates with the threads on the threaded portion 58 of the forward shaft 44.

The retaining ring 34 seats within the groove 60 on the forward shaft 44 to prevent the release of the locking ring 32 from the bushing 26.

The blade position adjustment mechanism 36 is formed of a blade member 80, a spring-loaded fastener 82 threadedly attached to the blade member 80, and a set screw 84 threadedly attached to the blade member 80 and which interacts with the spring-loaded fastener 82.

The blade member 80 has front and rear faces 80a, 80b, with upper, lower and side faces 80c, 80d, 80e extending therebetween. A cutting edge 86 is formed on the lower face 80d. A threaded passageway 88 extends through the blade member 80 from the upper face 80c to the lower face 80d and the spring-loaded fastener 82 is mounted therein. A threaded bore 90 extends from the side face 80e inwardly and the bore 90 is in communication with the passageway 88.

The fastener 82 is formed from a threaded shaft 92 having an enlarged head 94 at an end thereof. The shaft 92 seats through the aperture 49 in the top wall 42e of the mount 42, through the threaded passageway 88 in the blade member 80, and through the aperture 50 in the bottom wall 42f of the mount 42. As such, the blade member 80 is housed within the mount 42 and the cutting edge 86 extends into the passageway 28. The top end of the shaft 92 is secured to the blade mount 42 by a nut 96. The head 94 is proximate to the bottom wall 42f. A spring 98 surrounds the shaft 92, and is between the top side of wall 42f and the lower face 80d of the blade member 80. The bottom wall 42f may have a boss 100 surrounding the shaft 92 and the spring 98.

The set screw 84 has a head 102 which is capable of engaging with the side wall 42c of the mount 42, a shaft 104 which extends through the elongated slot 52 in the mount 42 and seats within the bore 90. Set screw 84 is capable of clamping blade member 80 to wall 42c.

The positions of the gripping portions 68 of the cable retention blocks 30 are adjustable relative to the bushing 26 by rotating the mounting plate 40. In order to allow for this rotation of the mounting plate 40, the locking ring 32 is rotated around the threaded portion 58 of the bushing 26 to space the rearward end 32b of the locking ring 32 from the front face 40a of the mounting plate 40. The mounting plate 40 is then rotated around the forward shaft 44 to move the cable retention blocks 30 radially inwardly or outwardly relative to the rotational axis 22 of the cable stripper 20. The pins 72 slide along the grooves 76 in the mounting plate 40 which causes the cable retention blocks 30 to move radially inwardly or outwardly relative to the bushing 26.

In use, the cable retention blocks 30 and the cutting edge 86 of the blade member 80 are positioned such that they do not interfere, or at least substantially interfere, with the insertion of a cable into the passageway 28 of the cable stripper 20 through the forward shaft 44. To effect the movement of the cable retention blocks 30, the locking ring 32 is rotated around the bushing 26 to disengage the locking ring 32 from the mounting plate 40. The mounting plate 40 is rotated around the forward shaft 44 which causes the pins 72 to slide along the grooves 76. This causes the cable retention blocks 30 to move radially outwardly relative to the forward shaft 44. During this radially outwardly movement, the attachment portions 70 of the cable retention blocks 30 slide through the slots 62 in the forward shaft 44. To effect the movement of the blade member 80, the set screw 84 is rotated to disengage the end from engagement with the fastener 82. The fastener 82 is then rotated which causes the blade member 80 to translate along the shaft 92 of the fastener 82.

The cable is then inserted into the passageway 28 through the forward shaft 44, past the cable retention blocks 30 and into the rearward shaft 46. The beveled surfaces 68b on the cable retention blocks 30 will aid in guiding the cable into the passageway 28 formed between the cable retention blocks 30 if the cable engages one or more of the cable retention blocks 30. Thereafter, the cable retention blocks 30 are moved to engage and hold the cable in the cable stripper 20. To effect the movement of the cable retention blocks 30, the mounting plate 40 is rotated in the opposite direction around the forward shaft 44 which causes the pins 72 to slide along the grooves 76. This causes the cable retention blocks 30 to move radially inwardly relative to the forward shaft 44. During this radially inwardly movement, the attachment portions 70 of the cable retention blocks 30 slide through the slots 62 in the forward shaft 44. Once the inner surfaces 68a of the cable retention blocks 30 engage the cable, the locking ring 32 is rotated around the threaded portion 58 of the bushing 26 to engage the rearward end 32b of the locking ring 32 against the front face 40a of the mounting plate 40. The mounting plate 40 and cable retention blocks 30 are then clamped between the front face wall 42a of the mount 42 and the rearward end 32b of the locking ring 32. This fixes the rotational position of the mounting plate 40 and fixes the radial position of the cable retention blocks 30 relative to the forward shaft 44 such that further movement of the cable retention blocks 30 is prevented in a radially inward or radially outward direction. To effect the movement of the blade member 80, the fastener 82 is then rotated in the opposite direction which causes the blade member 80 to translate linearly along the shaft 92 of the fastener 82 until the cutting edge 86 engages with the cable. The set screw 84 is then rotated to clamp blade member 80 with the wall 42c. Thereafter, the cable stripper 20 is rotated around the stationary cable to cut the insulation/jacket from the cable. As the cable stripper 20 is rotated around the stationary cable, a slight forward pressure is applied to provide the spiral cut along the length of the cable. As the cable stripper 20 rotates, the cutting edge 86 cuts into the insulation/jacket and removes it from the conductor. The removed insulation/jacket exits the cable stripper 20 via the slot 48. The passageway 28 formed by the cable retention blocks 30 holds the cable in sufficiently in place so the cutting edge 86 can maintain its position relative to the outer diameter of the cable, but the cable retention blocks 30 hold the cable loosely enough to permit rotation and axial movement of the cable relative to the cable stripper 20.

It is to be understood that the positions of the mounting plate 40 and the cable retention blocks 30 can be reversed such that the mounting plate 40 is proximate to the mount 42 and the cable retention blocks 30 are between the mounting plate 40 and the locking ring 32. The locking ring 32 can be moved to engage against the cable retention blocks 30 once the cable retention blocks 30 are positioned into a desired position to clamp the cable retention blocks 30 and the mounting plate 40 between the locking ring 32 and the mount 42.

It is to be understood that the position of the fastener 82 can be reversed such that the head 94 is proximate to the top wall 42e and the nut 96 is attached at the bottom wall 42f. Also, it is to be understood that the set screw 84 and slot 52 can be eliminated.

FIGS. 10-16 show the cable stripper 120 which includes a bushing 126 having a central passageway 128, cable retention blocks 130 mounted on the bushing 126 and extending through the bushing 126 and into the central passageway 28, a locking ring 32 and a retaining ring 34 mounted on the bushing 126, and a blade position adjustment mechanism 36 mounted on the bushing 126. The locking ring 32, retaining ring 34, and blade position adjustment mechanism 36 are identically formed to that previously described so the specifics are not repeated herein.

The bushing 126 is identically formed to that previously described such that like reference numerals are used to denote these components as were previously used, with the exception that the mounting plate 140 is proximate to the front wall of the mount 42 and affixed thereto. The mounting plate 140 may be formed separately from the forward shaft 44 and affixed thereto, or may be integrally formed with the forward shaft 44. The mounting plate 140 includes a plurality of spaced apertures 121 therethrough which are radially outwardly of the slots 62 in the bushing 126. The apertures 121 may be proximate to an outer edge 140c of the mounting plate 140.

The cable retention blocks 130 are pivotally attached to the mounting plate 140 and respective cable retention blocks 130 seat within respective ones of the slots 62 through the bushing 126 and extend into the passageway 28. Each cable retention block 130 may be identically formed. As shown by way of example, each cable retention block 130 has a gripping portion 168, an attachment portion 170 extending outwardly from the gripping portion 168, a pin 172 attached to the attachment portion 170, and a spring 123.

Each gripping portion 168 includes an inner face 168a for gripping the cable. The inner face 168a of each gripping portion 168 may be planar or may take other shapes which are suitable for gripping the cable. A front face 168b of each gripping portion 168 may be beveled.

The attachment portion 170 of each cable retention block 130 extends perpendicularly outwardly from the gripping portion 168. Each attachment portion 170 has a rearward wall 125 and a forward wall 127. The rearward wall 125 extends outwardly from a rear end of the gripping portion 168. The forward wall 127 extends forwardly from the rearward wall 125 and has an outer surface 131 which angles inwardly from the outer end 125a of the rearward wall 125 to the front of the gripping portion 168 and angles at an angle α relative to the rotational axis 22 of the cable stripper 20. The rearward wall 125 is wider than the gripping portion 168 such that a section 129 of the rearward wall 125 extends outwardly from the gripping portion 168.

The pin 172 extends through an unthreaded passageway in the section 129. The spring 123 seats between a head 173 of the pin 172 and the front of the section 129. The pin 172 may be integrally formed with the cable retention block 130, or may be formed as a separate member and attached to the attachment portion 170.

To assemble the cable retention blocks 130 with the bushing 126, each gripping portion 168 is inserted through a respective slot 62 until the attachment portion 170 seats within the slot 62 and the gripping portion 168 is within the passageway 28. The attachment portion 170 has a width which is less than the width of the slot 62 so that the cable retention blocks 130 can pivot within the respective slot 62. The pin 172 is threadedly attached to the respective aperture 121 in the mounting plate 140. In each cable retention block 130, the spring 123 engages the rearward portion 125 and engages the wall forming the slot 62 to bias the cable retention blocks 130 into an outward position such that the gripping portions 168 are withdrawn or substantially withdrawn from the passageway 28.

The locking ring 32 seats on the threaded portion 58 of the forward shaft 44 such that the cable retention blocks 130 are between the mounting plate 140 and the locking ring 32.

In use, the cable retention blocks 130 and the cutting edge 86 of the blade member 80 are positioned such that they do not interfere, or at least substantially interfere, with the insertion of a cable into the passageway 28 of the cable stripper 120 through the forward shaft 44. To effect the movement of the cable retention blocks 130, the locking ring 32 is rotated around the bushing 126 to disengage the locking ring 32 from the outer surfaces 131 of the cable retention blocks 130. Since the cable retention blocks 130 are normally biased outwardly from the rotational axis 22 by the springs 123, this causes the cable retention blocks 130 to pivot and move outwardly relative to the forward shaft 44. During this outward movement, the attachment portions 170 of the cable retention blocks 130 slide through the slots 62 in the forward shaft 44. To effect the movement of the blade member 80, the set screw 84 is rotated to release the blade member 80 from its clamped position with wall 42c. The fastener 82 is then rotated which causes the blade member 80 to translate along the shaft 92 of the fastener 82.

The cable is then inserted into the passageway 28 through the forward shaft 44, past the cable retention blocks 130 and into the rearward shaft 46. The beveled surfaces 168b on the cable retention blocks 130 will aid in guiding the cable into the passageway 28 formed between the cable retention blocks 130 if the cable engages one or more of the cable retention blocks 130. Thereafter, the cable retention blocks 130 are moved to engage and hold the cable in the cable stripper 120. To effect the movement of the cable retention blocks 130, the locking ring 32 is rotated in the opposite direction around the forward shaft 44 to engage the rearward surface 32b of the locking ring 32 with the outer surfaces 131 of the cable retention blocks 130. Continued rotation of the locking ring 32 causes the rearward end 32b of the locking ring 32 to further engage and travel along the outer surfaces 131 of the cable retention blocks 130. This causes the cable retention blocks 130 to pivot inwardly around pins 172, such that the attachment portions 170 pivot through the slots 62 and the gripping portions 168 pivot and move inwardly to grip the cable. The cable retention blocks 130 are then clamped between the inserted cable and the rearward end 32b of the locking ring 32. This prevents further radial movement of the cable retention blocks 130 relative to the forward shaft 44 in a radially outward direction. To effect the movement of the blade member 80, the fastener 82 is then rotated in the opposite direction which causes the blade member 80 to translate linearly along the shaft 92 of the fastener 82 until the cutting edge 86 engages with the cable. The set screw 84, if provided, is the rotated to clamp blade member 80 with the inner side of wall 42c. Thereafter, the cable stripper 120 is rotated around the stationary cable to cut the insulation/jacket from the cable. As the cable stripper 120 is rotated around the stationary cable, a slight forward pressure is applied to provide the spiral cut along the length of the cable. As the cable stripper 120 rotates, the cutting edge 86 cuts into the insulation/jacket and removes it from the conductor. The removed insulation/jacket exits the cable stripper 120 via the slot 48. The passageway 28 formed by the cable retention blocks 130 holds the cable in sufficiently in place so the cutting edge 86 can maintain its position relative to the outer diameter of the cable, but the cable retention blocks 130 hold the cable loosely enough to permit rotation and axial movement of the cable relative to the cable stripper 120.

While the pins 172 are shown as attached to the attachment portion 170, it is to be understood that the pins 172 can instead be provided as part of the mounting plate 140, with the pins 172 extending through apertures in the attachment portion 170.

FIGS. 18-20 show the cable stripper 120' which is identical to that shown in FIGS. 10-16, with the exception of the differences in the mounting plate 140' and the cable retention blocks 130' described herein.

The apertures 121 of the mounting plate 140 have been eliminated and instead, the mounting plate 140' includes a plurality of spaced apart elongated slots 121' therethrough. The slots 121' extend radially outwardly from the unthreaded portion 56 of the forward shaft 44.

The sections 129 of the cable retention blocks 130 of the cable stripper 120 have been eliminated and the pin 172 extends outwardly and rearwardly from the rearward wall 125 of the attachment portion 170 and seats within a respective slot 121' in the mounting plate 140. A spring 123' is attached between the rearward wall 125 of the attachment portion 170 and the front face 140a of the mounting plate 140 and may be mounted radially outwardly of the pin 172. The spring 123' biases each cable retention block 130' into a radially outward position relative to the rotational axis 22 of the cable stripper 120' such that the inner face 168a is radially outward of the passageway 28. The forward wall 127' of each attachment portion 170 extends forwardly from the rearward wall 125 and has an outer surface 131' which angles inwardly from the outer end 125a of the rearward wall 125 to the front of the gripping portion 168 and is parallel to the rotational axis 22 of the cable stripper 120'.

To assemble the cable retention blocks 130' with the bushing 126, each gripping portion 168 is inserted through a respective slot 62 until the attachment portion 170 seats within the slot 62 and the gripping portion 168 is within the passageway 28. The pins 172 are slideably mounted within the respective slot 121' in the mounting plate 140. In each cable retention block 130', the spring 123 biases the cable retention blocks 130' into an outward position such that the gripping portions 168 are withdrawn or substantially withdrawn from the passageway 28.

The locking ring 32 seats on the threaded portion 58 of the forward shaft 44 such that the cable retention blocks 130' are between the mounting plate 140 and the locking ring 32.

In use, the cable retention blocks 130' and the cutting edge 86 of the blade member 80 are positioned such that they do not interfere, or at least substantially interfere, with the insertion of a cable into the passageway 28 of the cable stripper 120' through the forward shaft 44. To effect the movement of the cable retention blocks 130', the locking ring 32 is rotated around the bushing 126 to disengage the locking ring 32 from the outer surfaces 131' of the cable retention blocks 130'. Since the cable retention blocks 130' are normally biased outwardly from the axis 22 by the springs 123', this causes the cable retention blocks 130' to move radially outwardly relative to the forward shaft 44. During this outward movement, the attachment portions 170 of the cable retention blocks 130' slide through the slots 62 in the forward shaft 44. To effect the movement of the blade member 80, the set screw 84 is rotated to disengage the clamping of blade member 80 with wall 42c. The fastener 82 is then rotated which causes the blade member 80 to translate along the shaft 92 of the fastener 82.

The cable is then inserted into the passageway 28 through the forward shaft 44, past the cable retention blocks 130' and into the rearward shaft 46. The beveled surfaces 168b on the cable retention blocks 130' will aid in guiding the cable into the passageway 28 formed between the cable retention blocks 130' if the cable engages one or more of the cable retention blocks 130'. Thereafter, the cable retention blocks 130' are moved to engage and hold the cable in the cable stripper 120'. To effect the movement of the cable retention blocks 130', the locking ring 32 is rotated in the opposite direction around the forward shaft 44 to engage the rearward surface 32b of the locking ring 32 with the outer surfaces 131' of the cable retention blocks 130'. Continued rotation of the locking ring 32 causes the rearward end 32b of the locking ring 32 to further engage and travel along the outer surfaces 131' of the cable retention blocks 130'. This causes the cable retention blocks 130' to move radially inwardly with the pin 172' sliding along the slot 121', such that the attachment portions 170' slide through the slots 62 and the gripping portions 168 move radially inwardly to grip the cable. The cable retention blocks 130' are then clamped between the front face 140a of the mounting plate 140 and the rearward end 32b of the locking ring 32. This prevents further radial movement of the cable retention blocks 130' relative to the forward shaft 44 in a radially outward direction. To effect the movement of the blade member 80, the fastener 82 is then rotated in the opposite direction which causes the blade member 80 to translate linearly along the shaft 92 of the fastener 82 until the cutting edge 86 engages with the cable. The set screw 84, if provided, is the rotated to clamp blade member 80 with the inner side of wall 42c. Thereafter, the cable stripper 120' is rotated around the stationary cable to cut the insulation/jacket from the cable. As the cable stripper 120' is rotated around the stationary cable, a slight forward pressure is applied to provide the spiral cut along the length of the cable. As the cable stripper 120' rotates, the cutting edge 86 cuts into the insulation/jacket and removes it from the conductor. The removed insulation/jacket exits the cable stripper 120' via the slot 48. The passageway 28 formed by the cable retention blocks 130' holds the cable in sufficiently in place so the cutting edge 86 can maintain its position relative to the outer diameter of the cable, but the cable retention blocks 130' hold the cable loosely enough to permit rotation and axial movement of the cable relative to the cable stripper 120'.

While the pins 172 are shown as being provided on the cable retention blocks 130' and the slots 121' are provided on the mounting plate 140', it is to be understood that the pins 172 can be instead provided on the mounting plate 140' and the slots 121' are provided on the cable retention blocks 130'.

Figure 9:
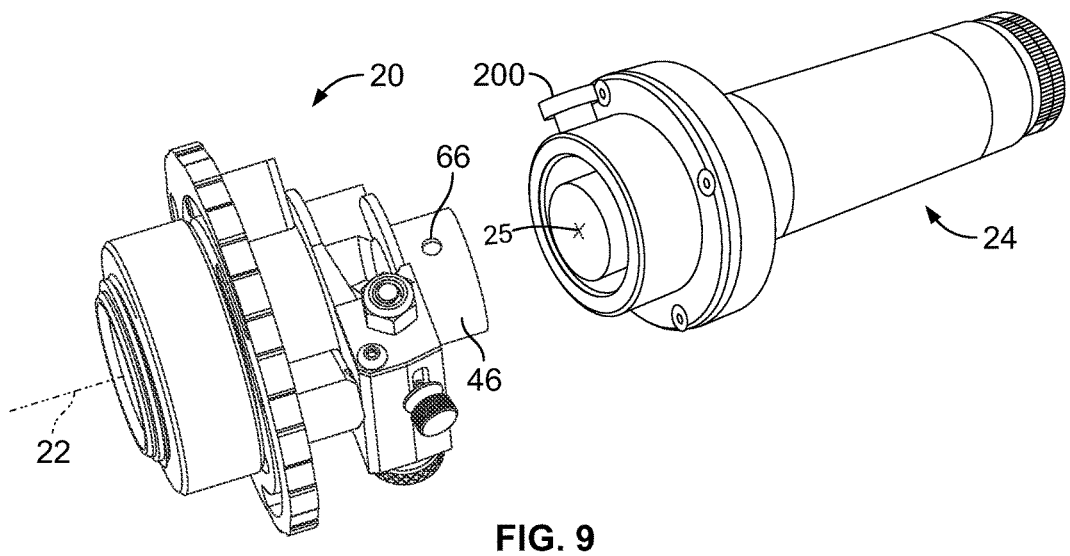
FIG. 9 is a front perspective view of the cable stripper of FIG. 1 shown exploded from an existing tool.
Figure 11:
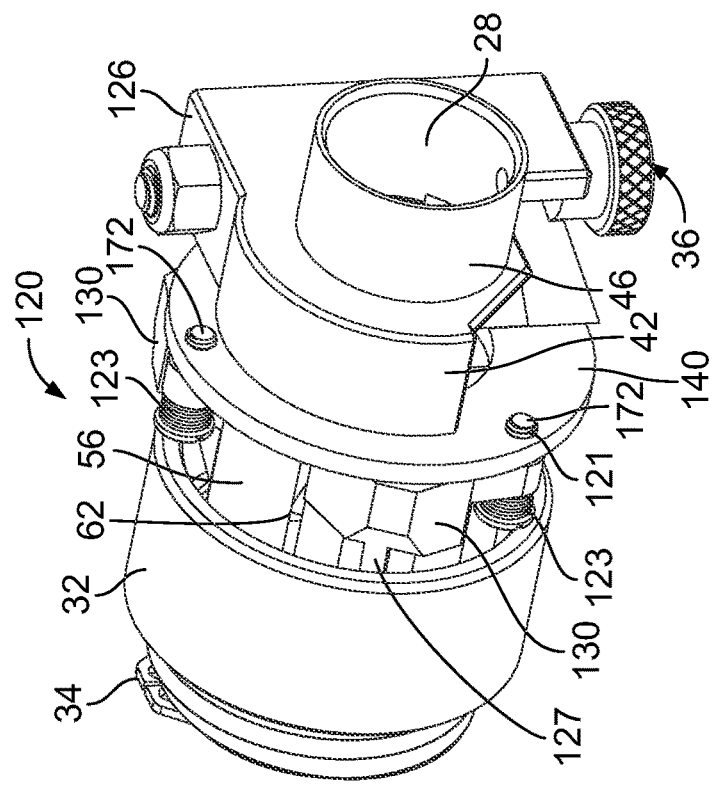
FIG. 11 is a rear perspective view of the cable stripper of FIG. 10.
Figure 10:
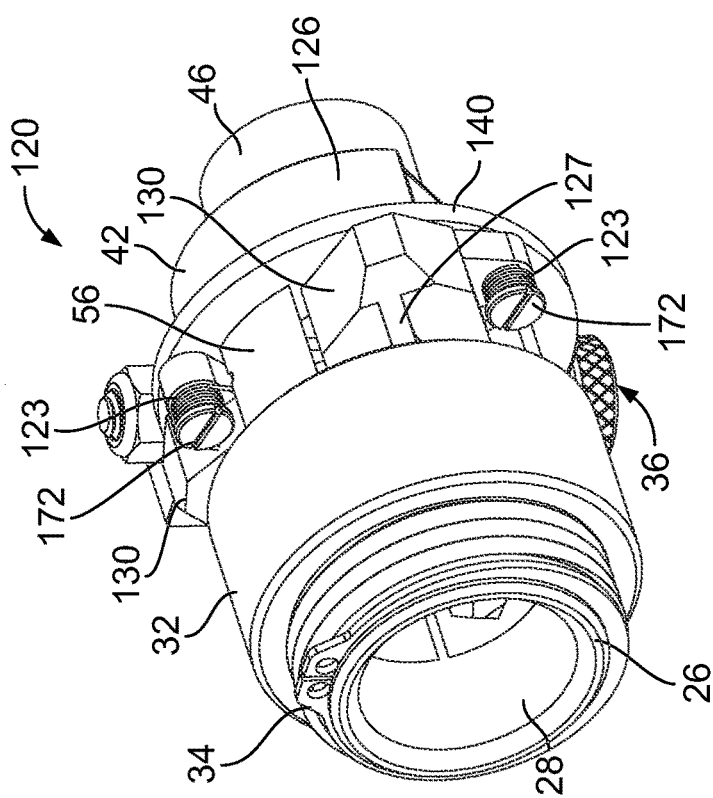
FIG. 10 is a front perspective view of a cable stripper.
Figure 12:
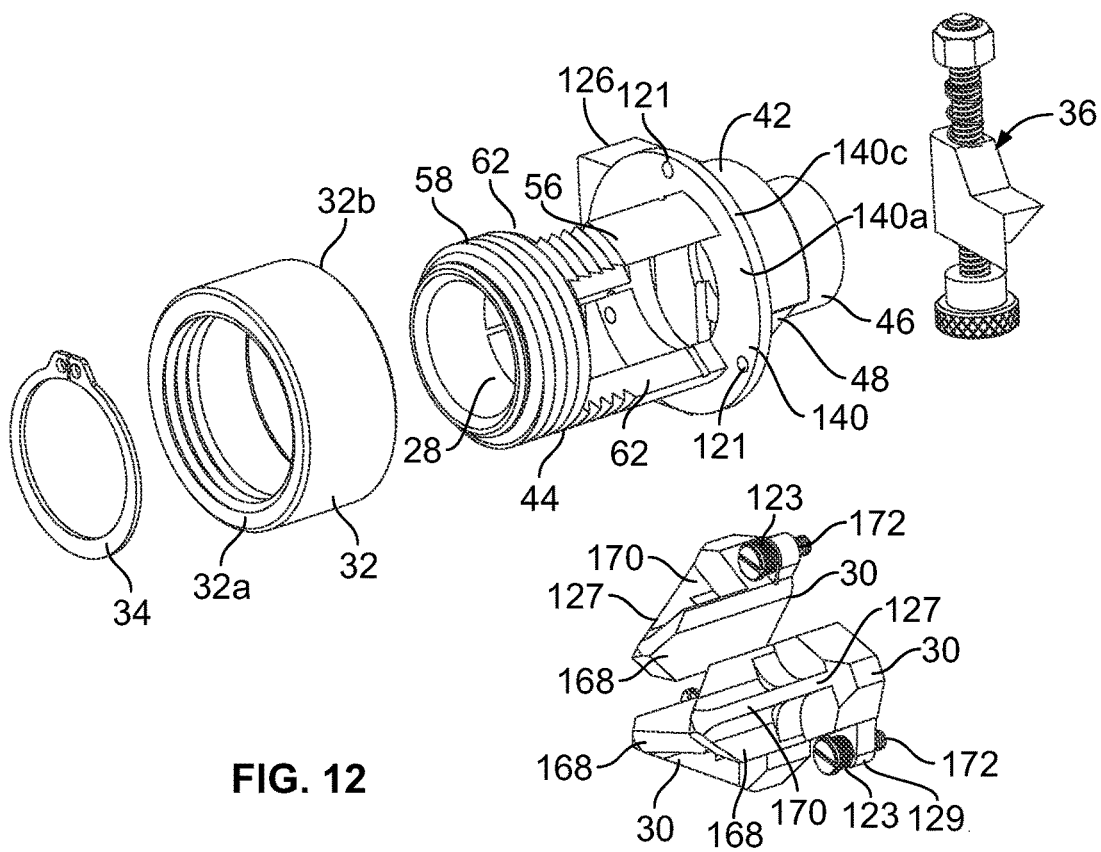
FIG. 12 is an exploded front perspective view of the cable stripper of FIG. 10.
Figure 13:
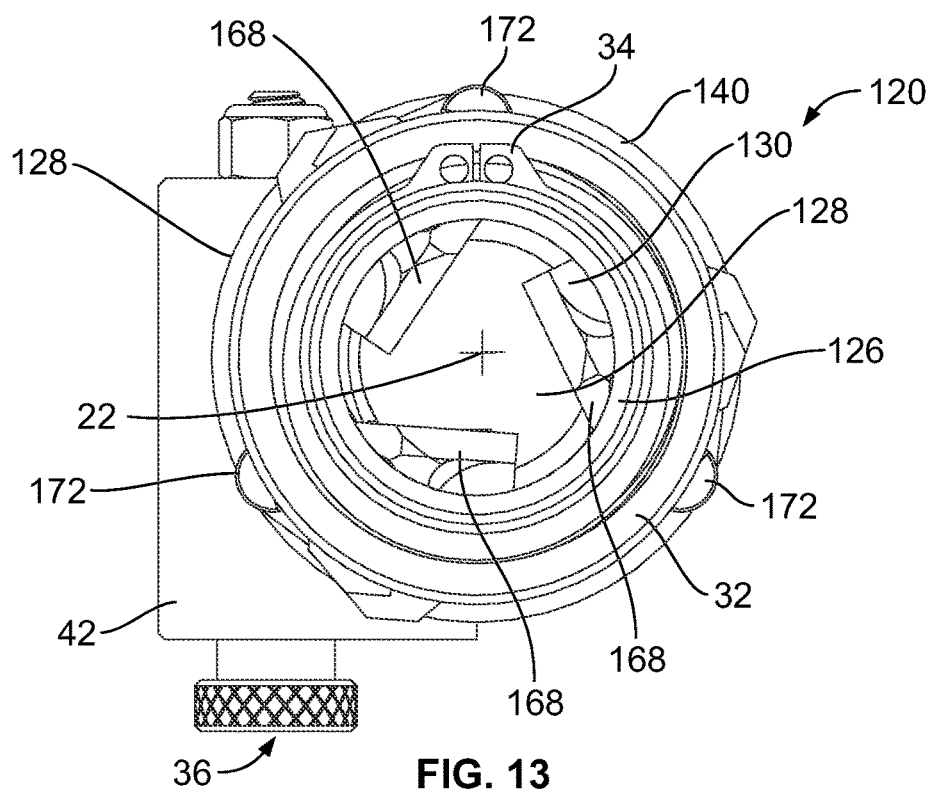
FIG. 13 is a front elevation view of the cable stripper of FIG. 10.
Figure 14:
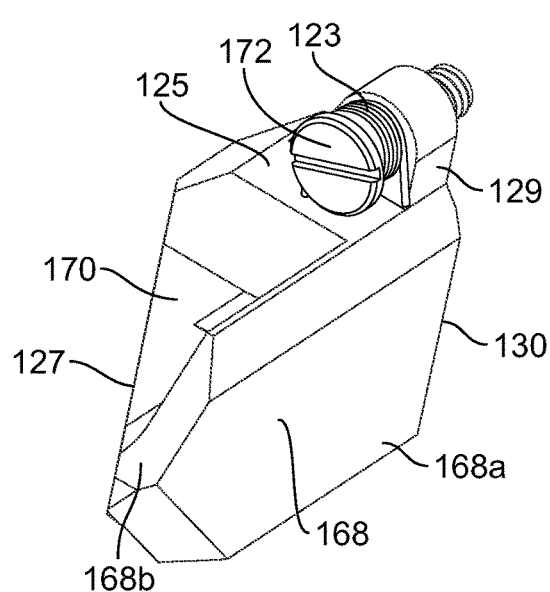
FIG. 14 is a front perspective view of a cable retention block of the cable stripper of FIG. 10.
Figure 15:
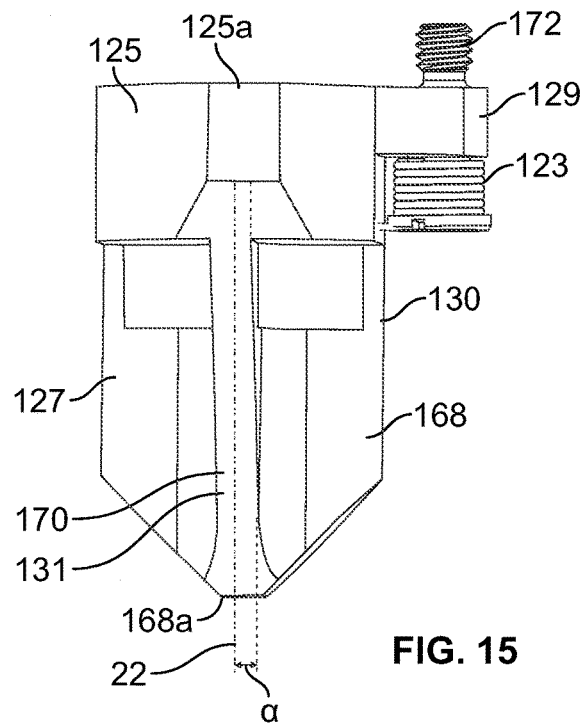
FIG. 15 is a top plan view of the cable retention block of FIG. 14.
Figure 16:
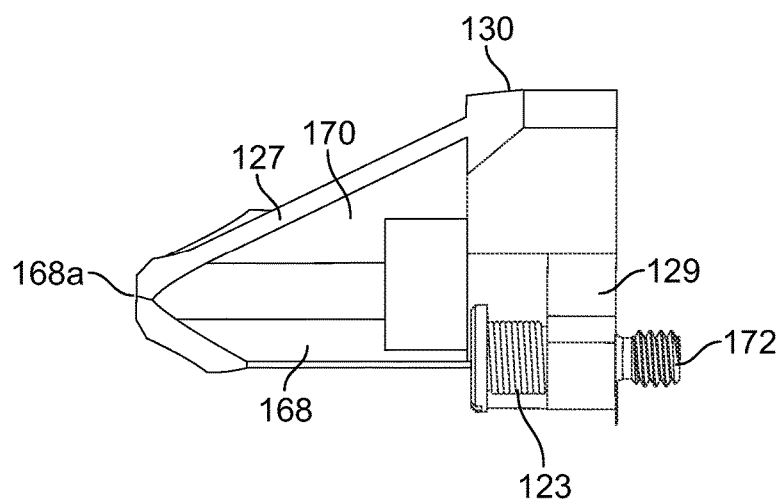
FIG. 16 is a side elevation view of the cable retention block of FIG. 14.
Figure 17:
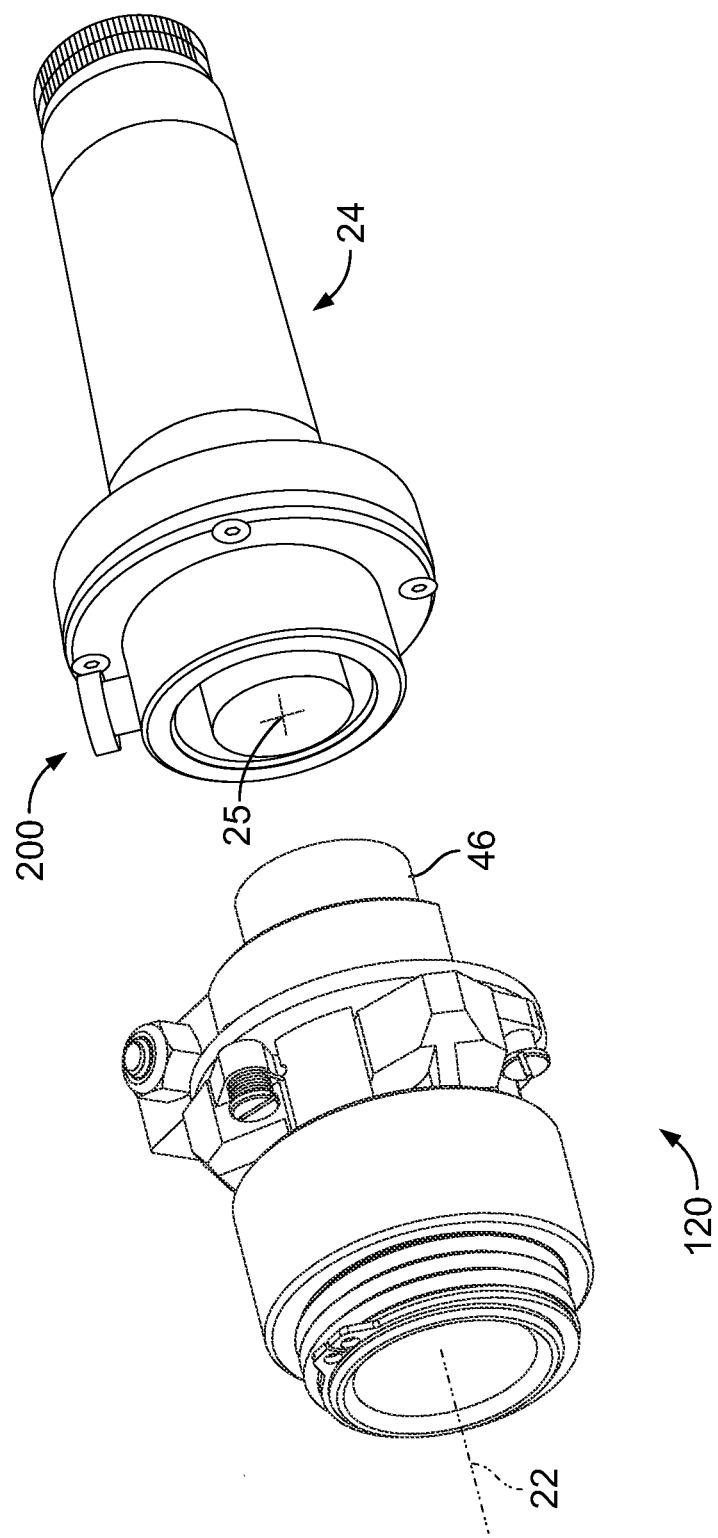
FIG. 17 is a front perspective view of the cable stripper of FIG. 10 shown exploded from an existing tool.

As shown in FIGS. 9 and 17, an existing tool 24 can be easily and quickly attached to the rearward shaft 46 of the cable stripper 20, 120, 120' to assist in the cable stripping process, for example because of the repetitive rotations required to fully strip the cable. Some existing tools 24 have a spring-loaded locking pin 200 that secures into the aperture 66 on the rearward shaft 46 of the bushing 26, 126. As shown by way of example, the spring-loaded locking pin 200 can be inserted to easily and quickly attach the existing tool 24 by inserting the spring-loaded locking pin 200 through the aperture 66. The rotational axis 25 of the existing tool 24 and the rotational axis 22 of the cable stripper 20 are linearly aligned. As the cable stripper 20 is rotated by the existing tool 24, the cutting edge 86 cuts into the insulation/jacket and removes it from the conductor. The passageway 28 formed by the cable retention blocks 30, 130, 130' holds the cable in sufficiently in place so the cutting edge 86 can maintain its position relative to the outer diameter of the cable, but the cable retention blocks 30, 130, 130' hold the cable loosely enough to permit rotation and axial movement of the cable relative to the cable stripper 20, 120, 120'. The passageway 28 formed by the cable retention blocks 30, 130, 130' also keeps the cable centered relative to the rotational axis 25 of the attached existing tool 24.

Other structures for removably attaching the existing tool 24 to the cable stripper 20, 120, 120' are within the scope of the present disclosure and the spring-loaded locking pin 200 is explemary.

While FIGS. 9 and 17 show the ability to removably attach an existing tool 24 to the cable stripper 20, 120, 120', it is to be understood that the existing tool 24 can be permanently attached to the rearward shaft 46 of the cable stripper 20, 120, 120', for example, but not limited to, by welding, adhesives.

Since the position of the cutting edge 86 is adjustable, this allows the cutting edge 86 to be positioned to match any size cable, plus any size of insulation/jacket that needs to be stripped from the conductor of the cable. The cutting edge 86 is angled to cut into the insulation/jacket at an angle, and produce a spiral cut up the length of the cable when the cable stripper 20, 120, 120' is operated.

It is to be understood that one or more of the cable retention blocks 130' and elongated slots 123' of the cable stripper 120' can be used in the cable stripper 120 such that some of the cable retention blocks 130' slide relative to the bushing 126 as shown in the cable stripper 120', and others of the cable retention blocks 130 pivot relative to the bushing 126 as shown in the cable stripper 120.

The cable stripper 20, 120, 120' provides a user with the ability to adjust the size of the opening that is used to contact the cable, and provides the user with the ability to adjust the blade height to accommodate different cable insulation/jacket thicknesses. The cable stripper 20, 120, 120' can also be connected to existing cable stripping tools, such as ratcheting handles and adapters for drills. Therefore, the cable stripper 20, 120, 120' eliminates the need for a user to deal with selecting an exactly sized bushing 26, 126 and blade depth, and instead allows for one adjustable cable stripper 20, 120, 120' to be connected to or permanently attached to an existing tool 24 to complete the cable stripping.

As a result of this structure of the cable stripper 20, 120, 120', the size of the passageway 28 formed by the cable retention blocks 30, 130, 130' and through which the cable extends is easily and quickly adjusted to accommodate differently sized cables.

Many modifications and other embodiments of the inventions set forth herein will come to mind to one skilled in the art to which these disclosed embodiments pertain having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the disclosure. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

What is claimed is:

1. A cable stripper capable of stripping insulation from a cable, the cable stripper comprising:
   a bushing comprising a mounting plate and a shaft extending outwardly therefrom, a passageway extending axially therethrough and a plurality of spaced slots provided through the shaft and in communication with the passageway;
   a plurality of cable retention blocks movably attached to the mounting plate and extending through the slots and into the passageway; and
   a locking ring having a passageway through which the shaft passes, the locking ring being movable along a longitudinal axis of the shaft, the locking ring being capable of being engaged with one of the mounting plate and the cable retention blocks, wherein when the locking ring is engaged, movement of the cable retention blocks relative to the bushing in at least a radially outward direction is prevented, the locking ring being capable of being disengaged therefrom to allow movement of the cable retention blocks relative to the bushing in at least the radially outward direction; and
   a blade member movably mounted on the bushing, the blade member configured to be at least partially seated within the passageway.

2. The cable stripper of claim 1, wherein the mounting plate is rotationally attached to the shaft.

3. The cable stripper of claim 2, wherein the mounting plate includes a plurality of partially spiral shaped grooves, each cable retention block having a pin seated within one of the respective grooves and slidable within the respective groove.

4. The cable stripper of claim 1, wherein one of the bushing and at least one of the cable retention blocks includes a pin and the other of the bushing and at least one of the cable retention blocks includes a slot, the pin is seated in the slot and slidable relative to the slot.

5. The cable stripper of claim 1, wherein the cable retention blocks are pivotable relative to the bushing.

6. The cable stripper of claim 5, wherein the cable retention blocks have an angled surface which is engageable with the locking ring to cause the pivotal movement.

7. The cable stripper of claim 1, wherein the bushing further comprises a second shaft extending from the mounting plate, the passageway further extending through the second shaft, the second shaft having an aperture therethrough in communication with the passageway.

8. The cable stripper of claim 7, wherein a portion of the first-defined shaft is threaded and the locking ring is threadedly engaged with the portion.

9. The cable stripper of claim 1, wherein a portion of the shaft is threaded and the locking ring is threadedly engaged with the threaded portion.

10. The cable stripper of claim 1 in combination with a tool, the tool configured to rotate the cable stripper relative to a stationary cable.

11. The cable stripper of claim 1 in combination with a tool comprising a body attachable to and detachable from the bushing.

12. The combination of claim 11, wherein a rotational axis of the tool and a rotational axis of the cable stripper are linearly aligned.

13. The combination of claim 11, wherein the bushing includes an aperture and the tool includes a spring-loaded pin which is engageable with the aperture.

14. The cable stripper of claim 1 in combination with a tool, the tool configured to rotate the cable stripper relative to a stationary cable.

15. The cable stripper of claim 4, further comprising a spring configured to bias the cable retention blocks relative to the bushing.

16. The cable stripper of claim 5 in combination with a tool, the tool configured to rotate the cable stripper relative to a stationary cable.

\* \* \* \* \*